HOT DRAWING TUBES

Original Filed May 28, 1964 3 Sheets-Sheet 1

INVENTORS
David A. Edgecombe
Howard W. Marshall
Sidley O. Evans
BY
J. P. Moran
ATTORNEY

HOT DRAWING TUBES

Original Filed May 28, 1964 3 Sheets-Sheet 3

United States Patent Office

Re. 26,457
Reissued Sept. 17, 1968

26,457

HOT DRAWING TUBES

David A. Edgecombe, Howard W. Marshall, and Sidley O. Evans, Beaver Falls, Pa., assignors to The Babcock & Wilcox Company, New York, N.Y., a corporation of New Jersey Original No. 3,293,894, dated Dec. 27, 1966, Ser. No. 370,851, May 28, 1964. Application for reissue Oct. 12, 1967, Ser. No. 682,694
6 Claims. (Cl. 72—42)

Matter enclosed in heavy brackets [ ] appears in the original patent but forms no part of this reissue specification; matter printed in italics indicates the additions made by reissue.

*ABSTRACT OF THE DISCLOSURE*

*A method of drawing a metal tube through a die wherein the tube is heated to a temperature in the range of 1500° to 2200° F. and a layer of glass-like lubricant which is viscous at the heated temperature is applied to the tube to aid in drawing.*

This invention relates to the deformation of metals, and particularly to the hot plug mandrel drawing of ferrous metal tubes.

In the tube production field many procedures are used to obtain the desired tube diameter and wall thickness in particular metal compositions. The tube may be extruded or pierced to the generally desired dimensions, but ordinarily the extruded or rotary pierced tube must be further worked to attain the desired dimensions and surface finish. Such working may be by cold working although some ferrous metal compositions are difficult or even impossible to cold work. Some working may be by hot processes where the tube is heated to a plastic or semi-plastic condition prior to working.

In any drawing procedure, whether hot or cold the tube must be clean and scale free. Also, in both, the percentage reduction each drawing pass is restricted to avoid tube failure by "necking" or rupture. In cold reduction it is desirable to anneal, clean and relubricate the tube before each reduction pass, while in hot reducing it is frequently possible to make two or more drawing passes of a tube without an intermediate reheat. Even with reheating, tube preparation for hot drawing of stainless steels is limited to an additional relatively simple application of lubricating material such as glass prior to each pass through the reducing die. Thus, in many instances hot drawing of tubes is more economical and the finished tube may be particularly desirable for some uses.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 1:
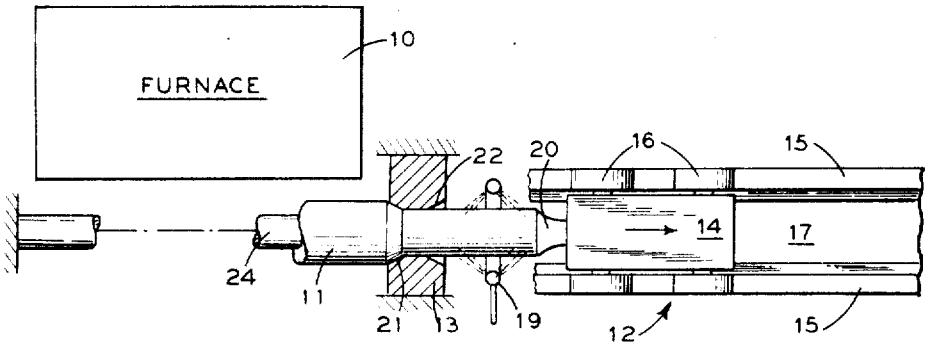
FIG. 1 is a schematic plan of a draw bench with a die, arranged with a furnace to illustrate an arrangement suitable to perform the present invention.

As shown in the drawings, the equipment arrangement illustrates a furnace 10 positioned at one side of the draw bench 12, so that the heated tube 11 may be transferred from the tfurnace to the draw bench with a minimum loss of tube heat. It will be understood the furnace can be located above or below, on either side, or in alignment with the draw bench, as desired in any particular installation.

In the usual draw bench arrangement a die 13 is mounted in a fixed location relative to the moving head or carriage 14 which moves on rails 15. The carriage 14 is mounted on wheels 16 and is positively driven along the rails 15, as for example by a hook (not shown) attached to the carriage and engaging an endless chain 17 operable between the rails 15. The carriage is provided with jaws 18 (indicated in FIG. 2) operable to engage the swaged or pointed end 20 of the tube 11.

As shown, the die 13 has a converging tapered entrance 21 and a diverging tapered exit 22, both of frusto-conical form. The die is mounted in well known manner for ready replacement of the die for changes in the desired diameter of the tube or for any other reason.

In the hot drawing procedure of this invention a mandrel or plug 23 is mounted on the end of a shaft or rod 24 which is longitudinally adjustable relative to the die 13 so that the mandrel 23 may be positioned within the tube 11 for proper coordination of the drawing operation. The mandrel 23 illustrated is generally cylindrical in shape and may have an integral end portion 25 of reduced diameter. The construction shown aids in the initial axial positioning of the mandrel, during the beginning of the tube drawing operation. In starting, the mandrel 23 is advanced with the tube 11 for the beginning of the outside diameter reduction, and as the tube is drawn through the die the mandrel will be advanced into the throat of the die 13. The internal shape of the tube will then be as indicated at 25' in FIG. 2 where the shoulder end portion 25 will also usually be indicated by an impression 26'.

Before any tube drawing can occur the tube must be at a desirable temperature which is dependent upon the composition of the tube metal. Generally the temperature range for ferrous tubes will be from 1500 to 2200° F. with a temperature of 1500 to 1900° F. for stainless steel, for example. We have found that a layer of glass lubricant must be applied to the tube surfaces before the tube is drawn to reduce the friction between the tube 11 and the work tools, i.e. the die 13 and the mandrel 23. The lubricant may be applied to the tube when the tube is at temperature or slightly below the desired working temperature. If at the latter temperature, the heating will be resumed after the glass lubricant has been applied to the tube.

With the desirable working temperature of the tube dependent upon the composition of the tube metal, the composition of the glass used as a lubricant will also vary with the metal of the tube to be worked. The lubricant desirably will coat the surface of the metal upon contacting the hot tube, while still retaining sufficient body or having a viscosity adequate to form a thin protective film between the tool and the workpiece. A suitable glass for the lubrication of stainless steel tubes heated to a working temperature of the order of 1900° F. has the following composition:

| | Percent |
|---|---|
| $SiO_2$ | 52.5 |
| $B_2O_3$ | 10.0 |
| $Na_2O$ | 37.5 |

Another glass suitable for the purposes has a lower $SiO_2$ and $Na_2O$ content, but a higher $B_2O_3$ content. This glass may also contain small percentages of aluminum, iron and calcium oxides.

Figure 2:
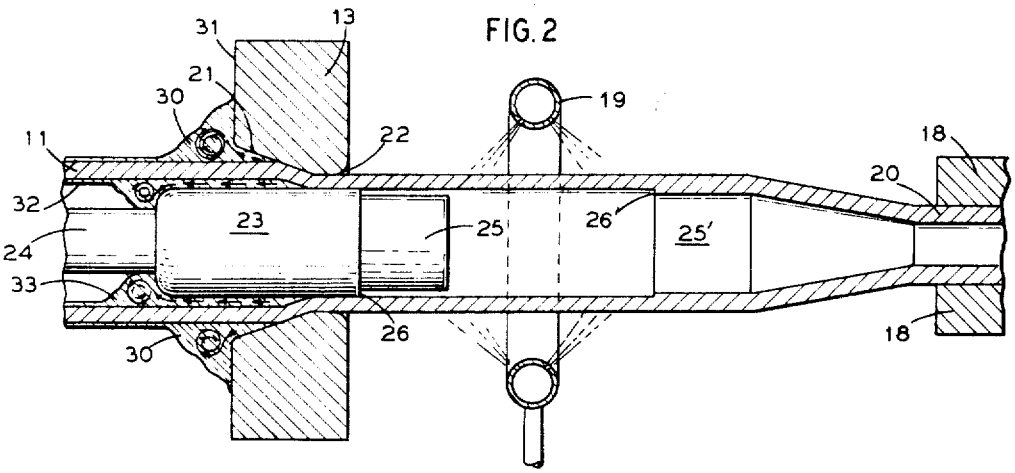
FIG. 2 is a large scale elevation, in section showing the relationship of a tube, die and plug mandrel when hot reducing a tube with a glass lubricant.

In applying the lubricating glass to the tube, the glass may be in any desirable form. For example, we have found that dipping the tube in a molten tank of glass-like material or a powdered glass is convenient, and either can be easily handled and applied. When powdered glass is used, the outside diameter of the tube will be coated with sufficient lubricant to protect the exterior surface while the tube is being drawn. This is illustrated in FIG. 2, where the glass lubricant 30 accumulates between the face 31 of the die 13 and the exterior surface of the tube 11. It is advantageous to coat the entire exterior surface of the tube, as can be accomplished by sprinkling powdered glass from a vibrating hopper.

We have also found it advantageous to coat the entire surface of the inside wall 32 of the tube to facilitate drawing of the metal over the mandrel 23 and through the die 13. It is advantageous to provide a sufficient quantity of glass lubricant for the inside surface of the drawn or reduced tube. Lubricating glass distribution to the inside of the tube 11 can be attained by flowing the glass powder in a transporting gas stream into the tube. The glass powder may also be introduced by a spoon or channel, or the like, along the bottom of the tube with the tube being rotated for circumferential distribution of the glass. Any excess of glass lubricant, in either solid or liquid form, will be rolled back or skimmed-off by the action of the mandrel 23 to provide an accumulation 33 similar to the accumulation 30 on the exterior surface of the tube.

In drawing a tube 11 through the die 13 and over the mandrel 23, the tube may be at temperature of 1950 F. and fully coated with lubricating glass, and while the drawing operation may start at a slow rate until the mandrel is set in proper position relative to the die, the drawing rate will thereafter be accelerated to a high rate. The drawing rate will usually be at least triple the possible rate for a corresponding cold reduction. Maintaining the high drawing rate protects tools from overheating and of course provides fast and economic operation.

We have found it desirable to preheat both the die and the mandrel prior to starting the drawing operation, so as to limit the cooling effect of tube contact with the die and the mandrel. A suitable preheat temperature will be 300 to 400° F. For the same reasons we have found it desirable to use a rod 24 of minimum cross-section consistent with strength requirements and to polish the exterior surface of the rod 24 to reflect radiant heat therefrom.

On occasion we have also found it desirable to cool and sometimes to actually quench the drawn tube closely downstream, in a tube drawing sense, of the die to strengthen the tube, so as to avoid "necking" or even rupturing the tube adjacent the die. A manifold 19 is shown in FIG. 2 for this purpose. Such conditions usually arise with a tube drawing area reduction in excess of 30%.

While it is possible to hold the plug mandrel 23 in the same position relative to the die 13 throughout the period of tube drawing, and still produce a tube finished to close dimensional tolerance and having desirable surfaces under the procedures hereinbefore described, the useful life of the plug mandrel is usually limited to the drawing of 6–12 tubes. On the other hand if the plug mandrel is controllably moved the useful life of the mandrel is of the order of 50–100 tube drawing cycles.

From a commercial standpoint we have found it desirable to positively drive or to permit controlled longitudinal movement of the plug mandrel 23 during the tube drawing process so as to reduce the damage to and wear on the plug mandrel 23. The positive controlled movement of the mandrel during the tube drawing cycle can be attained by mechanical means including a motor driven screw or a gear connection with the mechanism driving the carriage 14, or particularly in installation for drawing tubes of relatively large dimensions a hydraulic mechanism can be used. A suitable hydraulic system for the purpose is shown in FIGS. 3 to 6, inclusive.

Figure 3:
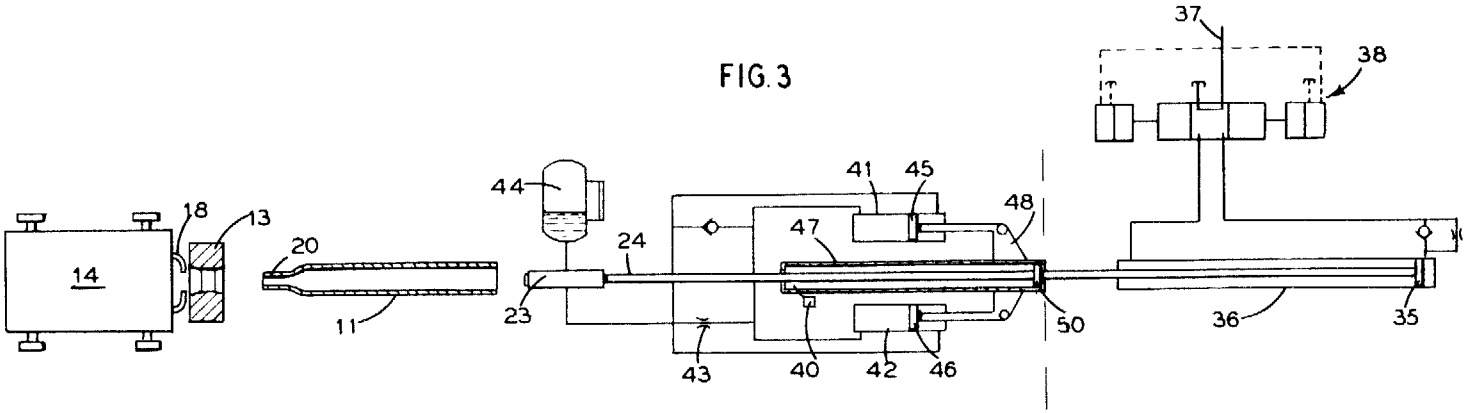
FIGS. 3 to 6 show schematically a typical sequence of operations of a draw bench constructed, arranged and operated in accordance with the present invention.

As shown, the plug mandrel 23 and rod 24 are positioned by a long stroke piston 35 operable in a cylinder 36. In FIG. 3, the plug mandrel 23 is shown in its retracted position so that the tube 11 may be positioned in longitudinal alignment with the die 13. The flow of hydraulic fluid from a pressure source (not shown) through a connecting pipe 37 to the cylinder 36 is regulated by a conventional flow control device indicated generally at 38. The flow control device may be electrically actuated by a push button or the like to advance from the position of the mandrel shown in FIG. 3 to the position shown in FIG. 4, where the advance to the position shown in the latter view is limited by contact with a limit switch 40.

Figure 4:
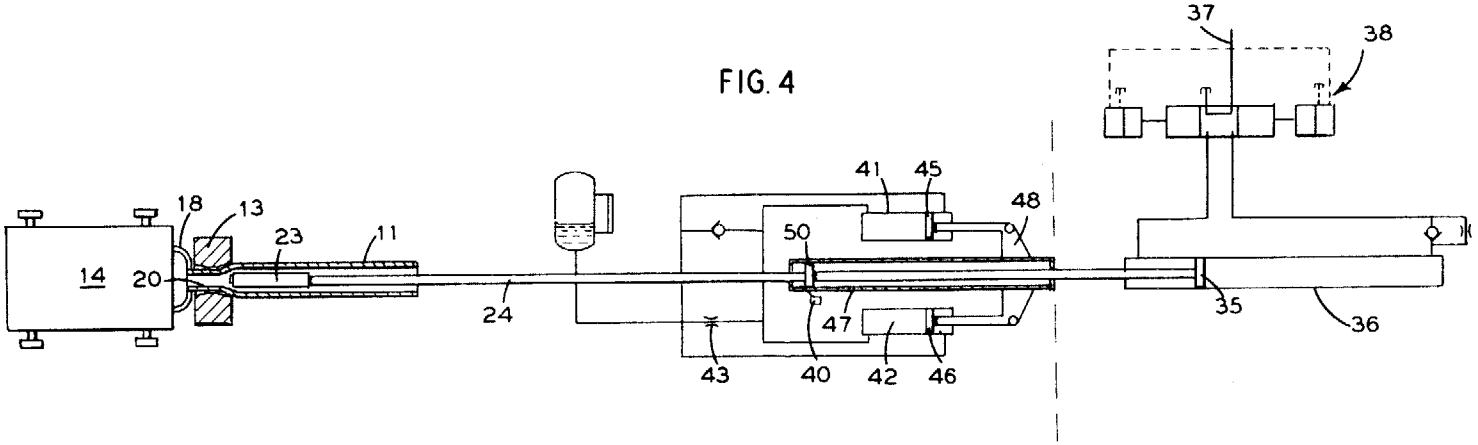
Figure 5:
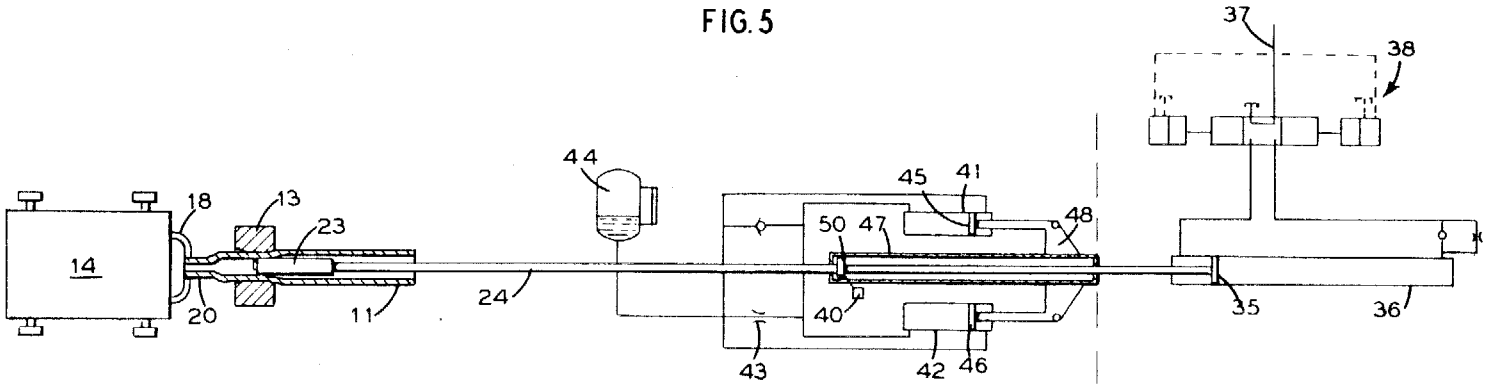

In FIG. 4, the tube 11 has been advanced with its neck portion 20 pushed through the die 13 to be gripped by the jaws 18 of the carriage 14. The movement of the tube is independent of mandrel movement, and while the tube and mandrel advance may be simultaneous to the position shown in FIG. 4, the advances need not be simultaneous.

With the start of the drawing operation, the carriage 14 will move away from the die 13 and at the same time the mandrel 23 will set within the tube 11 and within the die. The start of the carriage movement will either automatically or manually further advance the mandrel to the position shown in FIG. 5. The mandrel 23 is slowly advanced during the tube draw, where the advance will be controlled in an amount of 2 to 7 inches, so as to avoid localized overheating of the mandrel.

The mandrel 23 advance is regulated by bleeding hydraulic fluid from a pair of hydraulic cylinders 41 and 42 through a flow control valve 43 into a pressurized accumulator 44. The valve 43 is controlled to regulate the rate of hydraulic fluid movement therethrough so that the movement of pistons 45 and 46 in the cylinders 41 and 42, respectively, permits a corresponding movement of an elongated hollow element 47. The element 47 is connected to and supported by a yoke 48 on the piston rods of the pistons 45 and 46 so that movement of the element 47 by reason of a movement of a collar 50 bearing on an end wall of the element as effected by piston 35 is limited in rate and length by the fluid flow through the valve 43.

Figure 6:
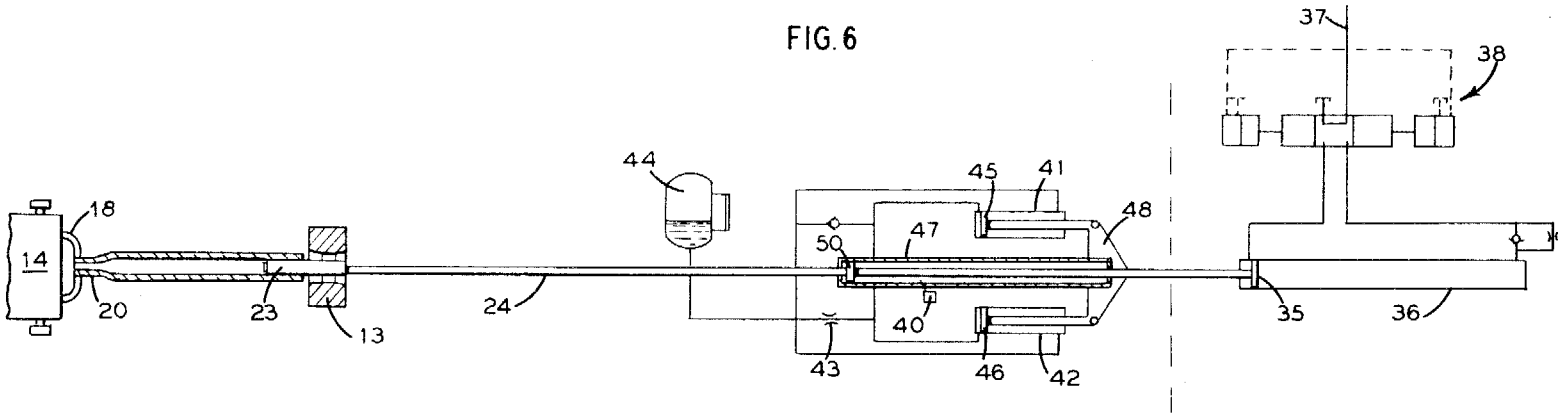

At the end of the tube drawing operation the mandrel 23 will be advanced to the position shown in FIG. 6. Thereafter the drawn tube is removed, and the mandrel retracted to the position shown in FIG. 3, for the next tube drawing cycle.

By way of example and not of limitation hot stainless steel tubes were drawn according to our invention as shown in the following table:

EXPERIMENT #14

| | Outside diameter, inches | | Percent O.D.,[1] Red. | Percent Wall Red. | Percent Total Area Reduction |
|---|---|---|---|---|---|
| Start | 2.375 | .154 | | | |
| (2) | 2.019 | .134 | 15 | 15 | 26.5 |
| (2) | 1.560 | .134 | 23 | | |
| End | 1.516 | .125 | (3) | | |

EXPERIMENT #4

| | | | | | |
|---|---|---|---|---|---|
| Start | 3.500 | .300 | | | |
| (2) | 2.966 | .274 | 15.3 | 10 | 24.3 |
| (2) end | 2.482 | .206 | 16.6 | 25 | 36.5 |

EXPERIMENT #5

| | | | | | |
|---|---|---|---|---|---|
| Start | 3.500 | .300 | | | |
| (2) | 2.966 | .274 | 15.3 | 10 | 24.3 |
| (2) end | 2.243 | .239 | 24.4 | 14.9 | 36.5 |

EXPERIMENT #6

| | | | | | |
|---|---|---|---|---|---|
| Start | 3.500 | .300 | | | |
| (2) end | 2.415 | .300 | 31 | | 34 |

EXPERIMENT #7

| | | | | | |
|---|---|---|---|---|---|
| Start | 3.500 | .218 | | | |
| (2) end | 2.415 | .218 | 31 | | 34 |

EXPERIMENT #26

| | | | | | |
|---|---|---|---|---|---|
| Start | 3.360 | .185 | | | |
| (2) | 2.850 | .154 | 15.2 | 16.8 | 29.4 |
| (2) | 2.141 | .154 | 24.9 | | 26 |
| (2) | 1.820 | .144 | 15 | 6.5 | 21 |
| (2) | 1.548 | .144 | 16.1 | | 25 |
| End | 1.516 | .134 | (3) | | |

[1] Outside Dimension.
[2] Hot Dimension.
[3] Cold Dimension.

The hot drawing procedure of the present invention is particularly useful in the drawing of tubes, but can be usefully applied in the area reduction of other shapes. Tubes finished by hot reduction have had exceptional surfaces, and the dimensional control has been well within commercial tolerances. It has also been found to produce finished tubes of either large and small diameters, and there is no known limit on diameter to wall ratios.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. The method of drawing a [ferrous] metal workpiece through a die to change the cross-section of the workpiece which comprises the steps of heating the workpiece to a temperature in the range of 1500 to 2200° F., applying a layer of glass-like lubricant to the surface of said hot workpiece, said glass-like lubricant being viscous at the heated temperature, and drawing said hot lubricated workpiece to change the cross-section thereof with the viscous glass-like lubricant protecting the surfaces of the workpiece during drawing.

2. The method of hot drawing wherein a tube is drawn through a die and over a mandrel to change the cross-section of the tube which comprises the steps of heating the tube to a temperature in the range of 1500 to 2200° F., applying a layer of glass-like lubricant to the inner and outer surfaces of said hot tube, said glass-like lubricant being viscous at the heated temperature, and drawing said hot lubricated tube to change the cross-section thereof with the viscous glass-like lubricant protecting the surfaces of the tube during drawing.

3. The method of hot drawing wherein a stainless steel tube is drawn through a die and over a mandrel to change the cross-section of the tube which comprises the steps of heating the tube to a temperature in the range of 1500 to 1900° F., applying a layer of glass-like lubricant to the inner and outer surfaces of said tube, said glass-like lubricant being viscous at the heated temperature, and drawing said hot lubricated tube to change the cross-section thereof with the viscous glass-like lubricant protecting the surfaces of the tube during drawing.

4. The method of drawing a ferrous metal tube through a die and over a mandrel to change the cross-section of the tube which comprises the steps of heating the tube to a temperature in the range of 1500 to 2200° F., preheating the die and mandrel to a temperature of the order of 400° F., applying a layer of glass-like lubricant to the surfaces of said tube, said glass-like lubricant being viscous at the heated temperature, and drawing said hot lubricated tube to change the cross-section thereof with the viscous glass-like lubricant protecting the surfaces of the tube and die and mandrel during drawing.

5. The method of drawing a ferrous metal tube through a die and over a mandrel to change the cross-section of the tube which comprises the steps of heating the tube to a temperature in the range of 1500 to 2200° F., applying a layer of glass-like lubricant to the surfaces of said hot tube, said glass-like lubricant being viscous at the heated temperature, drawing said hot lubricated tube to change the cross-section thereof with the viscous glass-like lubricant protecting the surfaces of the tube during drawing, and moving the mandrel relative to the die while the tube is being drawn through the die and over the mandrel.

6. The method of hot drawing wherein a tube is drawn through a die and over a mandrel to change the cross-section of the tube which comprises the steps of heating the tube to a temperature in the range of 1500 to 2200° F., applying a layer of glass-like lubricant to the inner and outer surfaces of said tube, said glass-like lubricant being viscous at the heated temperature of the tube, preheating the die and mandrel to a temperature of the order of 400° F., drawing said hot lubricated tube to change the cross-section thereof with the viscous glass-like lubricant protecting the surfaces of the tube during drawing, and quenching the drawn tube leaving the die to avoid rupturing of the tube.

References Cited

The following references, cited by the Examiner, are of record in the patented file of this patent or the original patent.

UNITED STATES PATENTS

| | | | |
|---|---|---|---|
| 537,454 | 4/1895 | Hewlett | 72—286 |
| 2,067,530 | 1/1937 | Ihrig | 72—42 |
| 2,285,539 | 6/1942 | Staples et al. | 72—283 |
| 2,351,710 | 6/1944 | Sanders | 72—283 |
| 2,390,644 | 12/1945 | Diehn | 72—42 |
| 3,021,941 | 2/1962 | Huet | 72—42 |
| 3,039,888 | 6/1962 | Sejournet et al. | 72—42 |

RICHARD J. HERBST, *Primary Examiner.*